(12) United States Patent
Dulaney

(10) Patent No.: US 9,449,092 B2
(45) Date of Patent: Sep. 20, 2016

(54) METHOD AND APPARATUS REQUESTING INFORMATION UPON RETURNING TO A SEARCH RESULTS LIST

(75) Inventor: Marissa H. Dulaney, Morgan Hill, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1801 days.

(21) Appl. No.: 12/178,963

(22) Filed: Jul. 24, 2008

(65) Prior Publication Data

US 2014/0250139 A1    Sep. 4, 2014

(51) Int. Cl.
*G06F 17/30* (2006.01)

(52) U.S. Cl.
CPC .............. *G06F 17/30864* (2013.01)

(58) Field of Classification Search
CPC .................................. G06F 17/30864
USPC ......... 707/705, 722, 723, 758, 781; 715/841
See application file for complete search history.

(56) References Cited

U.S. PATENT DOCUMENTS

| | | | |
|---|---|---|---|
| 6,766,321 B2 * | 7/2004 | Sasaki et al. | |
| 6,990,490 B2 * | 1/2006 | Sasaki et al. | |
| 7,031,952 B1 * | 4/2006 | Heumann | G06N 5/022 |
| 7,302,426 B2 * | 11/2007 | Bier | |
| 7,334,195 B2 * | 2/2008 | Gemmell et al. | 715/841 |
| 7,418,403 B2 * | 8/2008 | Reid | G06Q 10/063 705/7.42 |
| 7,502,786 B2 * | 3/2009 | Liu et al. | |
| 7,558,792 B2 * | 7/2009 | Bier | |
| 7,587,392 B2 * | 9/2009 | Jhaveri et al. | |
| 7,599,950 B2 * | 10/2009 | Walther et al. | |
| 7,657,522 B1 * | 2/2010 | Puzicha et al. | 707/723 |
| 7,725,472 B2 * | 5/2010 | Uchiyama | 707/758 |
| 7,747,611 B1 * | 6/2010 | Milic-Frayling et al. | 707/722 |
| 7,761,436 B2 * | 7/2010 | Norton et al. | 707/705 |
| 7,774,326 B2 * | 8/2010 | Arrouye et al. | 707/705 |
| 7,797,635 B1 * | 9/2010 | Denise | 715/738 |
| 7,801,885 B1 * | 9/2010 | Verma | 707/713 |
| 7,908,559 B1 * | 3/2011 | Denise | 715/738 |
| 7,934,161 B1 * | 4/2011 | Denise | 715/738 |
| 9,092,523 B2 * | 7/2015 | Tanne | |
| 2002/0087526 A1 * | 7/2002 | Rao | G06F 17/30867 |
| 2003/0050816 A1 * | 3/2003 | Givens | G06Q 10/063112 705/7.14 |
| 2005/0120023 A1 * | 6/2005 | Wesinger | G06F 17/3089 |
| 2006/0179035 A1 * | 8/2006 | Broker | 707/3 |
| 2006/0190444 A1 * | 8/2006 | Wesinger | G06F 17/3089 |
| 2007/0027830 A1 * | 2/2007 | Simons et al. | 707/1 |
| 2007/0100799 A1 * | 5/2007 | Rose | G06F 17/30395 |
| 2007/0100800 A1 * | 5/2007 | Rose | G06F 17/30395 |
| 2007/0100883 A1 * | 5/2007 | Rose | G06F 17/30994 |
| 2007/0100915 A1 * | 5/2007 | Rose | G06F 17/30873 |
| 2007/0219995 A1 * | 9/2007 | Heumann | G06F 17/30864 |
| 2008/0059453 A1 * | 3/2008 | Laderman | G06F 17/30648 |
| 2008/0183664 A1 * | 7/2008 | Cancel | G06Q 30/02 |
| 2008/0222145 A1 * | 9/2008 | Liu et al. | 707/5 |
| 2009/0013285 A1 * | 1/2009 | Blyth et al. | 715/816 |
| 2009/0089415 A1 * | 4/2009 | Lecomte | G06F 17/30861 709/224 |

* cited by examiner

*Primary Examiner* — Jean M Corrielus
(74) *Attorney, Agent, or Firm* — Kilpatrick Townsend & Stockton LLP

(57) ABSTRACT

A method, apparatus and computer program product for requesting information upon returning to a search results list is presented. A search results list is presented to a user. The user can then navigate to an item referenced in the search results list. The user is provided with additional content when the user returns to the search results list, the additional content permitting the user to provide comments regarding the item previously navigated to from said search results list.

24 Claims, 5 Drawing Sheets

METHOD AND APPARATUS REQUESTING INFORMATION UPON RETURNING TO A SEARCH RESULTS LIST

BACKGROUND

One of the most common uses of the Internet is to conduct searches. A user can access a web page of a particular search engine, enter a query, and receive a list of results relating to the query. The results can include links to text, audio or video files. The results are presented in a particular order. The order of the results can be based on a variety of factors.

Some entities provide an online help system for their products or services that incorporates a search engine as part of the online help system. Within this online help system, a user can perform a search that will help address a question or a problem a user may be encountering.

For example, a user might use an online help system to search for help regarding a particular option in a software application. The user enters his or her query within the online help system for the application and is presented with a list of search results pertaining to their query. The user can then navigate to a particular result of interest and view the content identified in the search results list. Once the user is finished reviewing the item selected from the search results list, the user can return to the search results list (for example by clicking on the "back" button on their web browser). In standard Hyper-Text Markup Language (HTML) pages, if a user returns to a search results list, a previously visited link is highlighted in a different color to represent the item has been previously viewed by the user.

Within the search results list, the user can see comments (including a rating) that have been provided about the particular result. In some instances, the comments and rating a may be used to prioritize a result within the search results list.

SUMMARY

Conventional mechanisms such as those explained above suffer from a variety of deficiencies. One such deficiency is that a user typically cannot provide rating information about an item in the search results list on the same page as the search results list itself. In order to provide comments (including a ranking), the user is required to navigate to another page to enter the comments regarding the particular search result item. Few users will actually provide comment information, as they don't want to be bothered with the additional steps required to navigate to a ratings page, enter comments and navigate back to the search results list.

Embodiments of the invention significantly overcome such deficiencies and provide mechanisms and techniques that update a search results list to ask the user for information about a particular search result after determining that the user has navigated back to the search result. Instead of just returning the user to the search results list with the link highlighted in a different color (per standard HTML), when the user returns to the search results list additional content is presented regarding the item previously visited by the user. The additional content enables the user to provide information about the search result they visited, in the context of the search result list they are returning to.

In a particular embodiment of a method for requesting information upon returning to a search results list, the method includes providing a search results list to a user and permitting the user to navigate to an item referenced in the search results list. The method further includes providing the user with additional content when the user returns to the search results list, the additional content enabling the user to provide comments regarding the item previously navigated to from the search results list.

Other embodiments include a computer readable medium having computer readable code thereon requesting information upon returning to a search results list. The computer readable medium includes instructions for providing a search results list to a user. The computer readable medium also includes instructions for permitting the user to navigate to an item referenced in the search results list. The computer readable medium further includes instructions for providing the user with additional content when the user returns to the search results list, the additional content permitting the user to provide comments regarding the item previously navigated to from the search results list.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that requests information upon returning to a search results list as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations requesting information upon returning to a search results list as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Adobe Systems Incorporated of San Jose, Calif.

Note that each of the different features, techniques, configurations, etc. discussed in this disclosure can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the presently disclosed method and apparatus for requesting information upon returning to a search results list updates the search results list to request the user to provide information about a particular search result after knowing that the user has previously navigated to a particular search result content.

Figure 1:
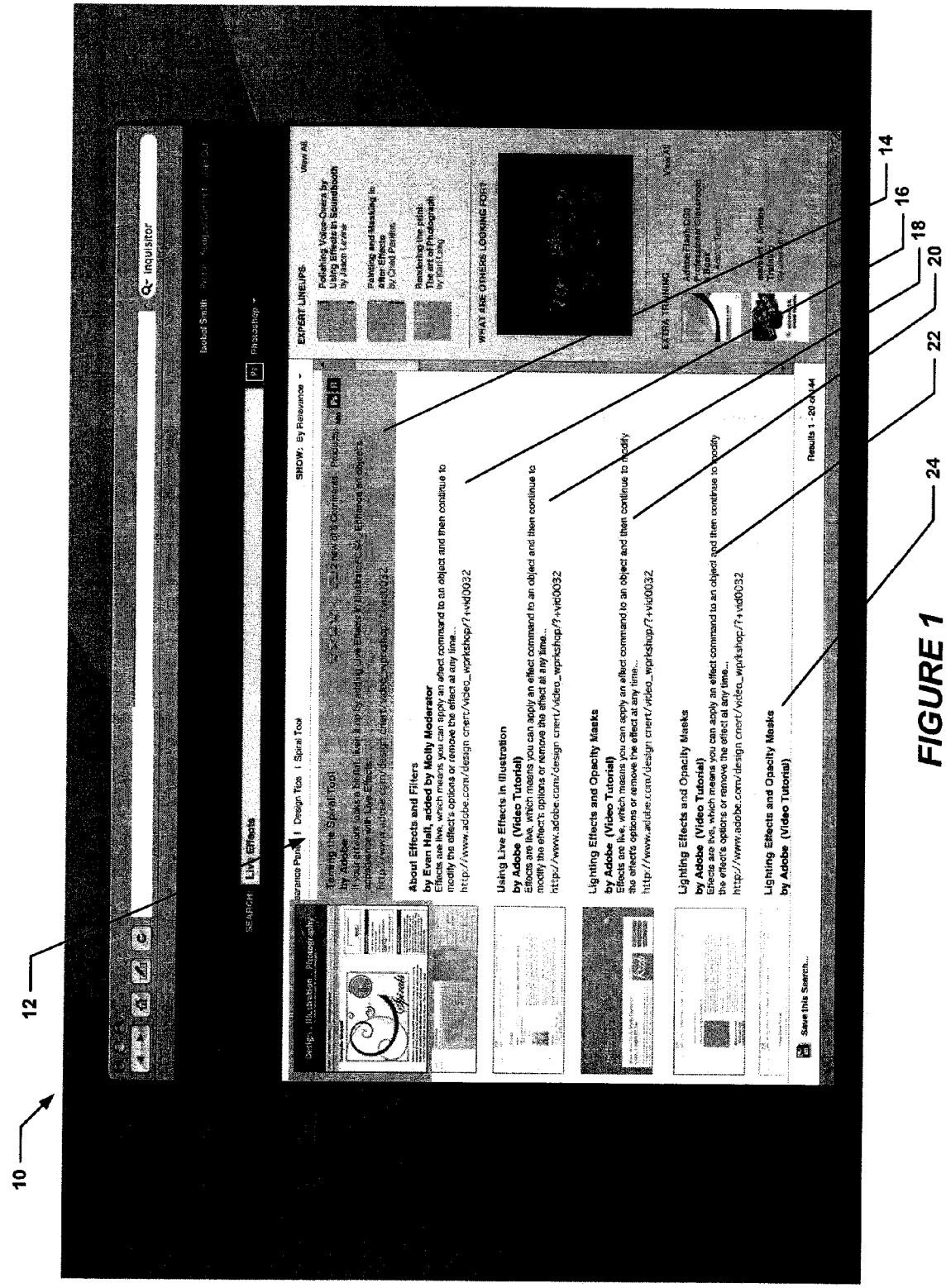
FIG. 1 depicts a screen shot showing a typical search results list presented in response to a query.

Referring now to FIG. 1, a graphical user interface (GUI) 10 is shown for an online help system. Although the presently described method and apparatus requesting information upon returning to a search results list is described with respect to an online help system, it should be appreciated that the same concepts are applicable to other applications, including but not limited to, general search engines, video sharing websites, picture sharing websites, audio (music) sharing websites, document sharing websites, information websites (news, weather, sports) and the like.

Figure 2:
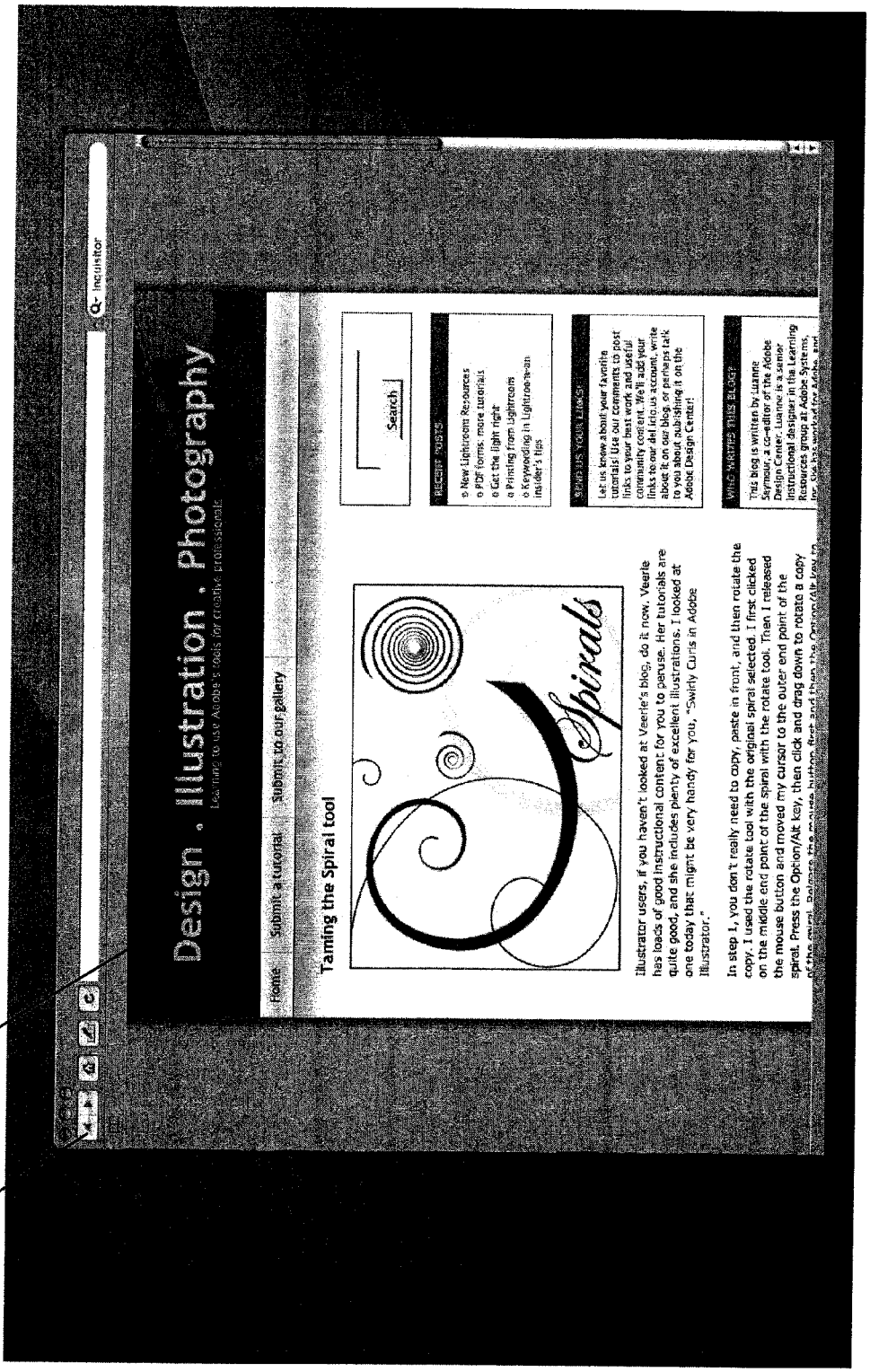
FIG. 2 depicts a screen shot of a selected item from the search results list of FIG. 1.
Figure 3:
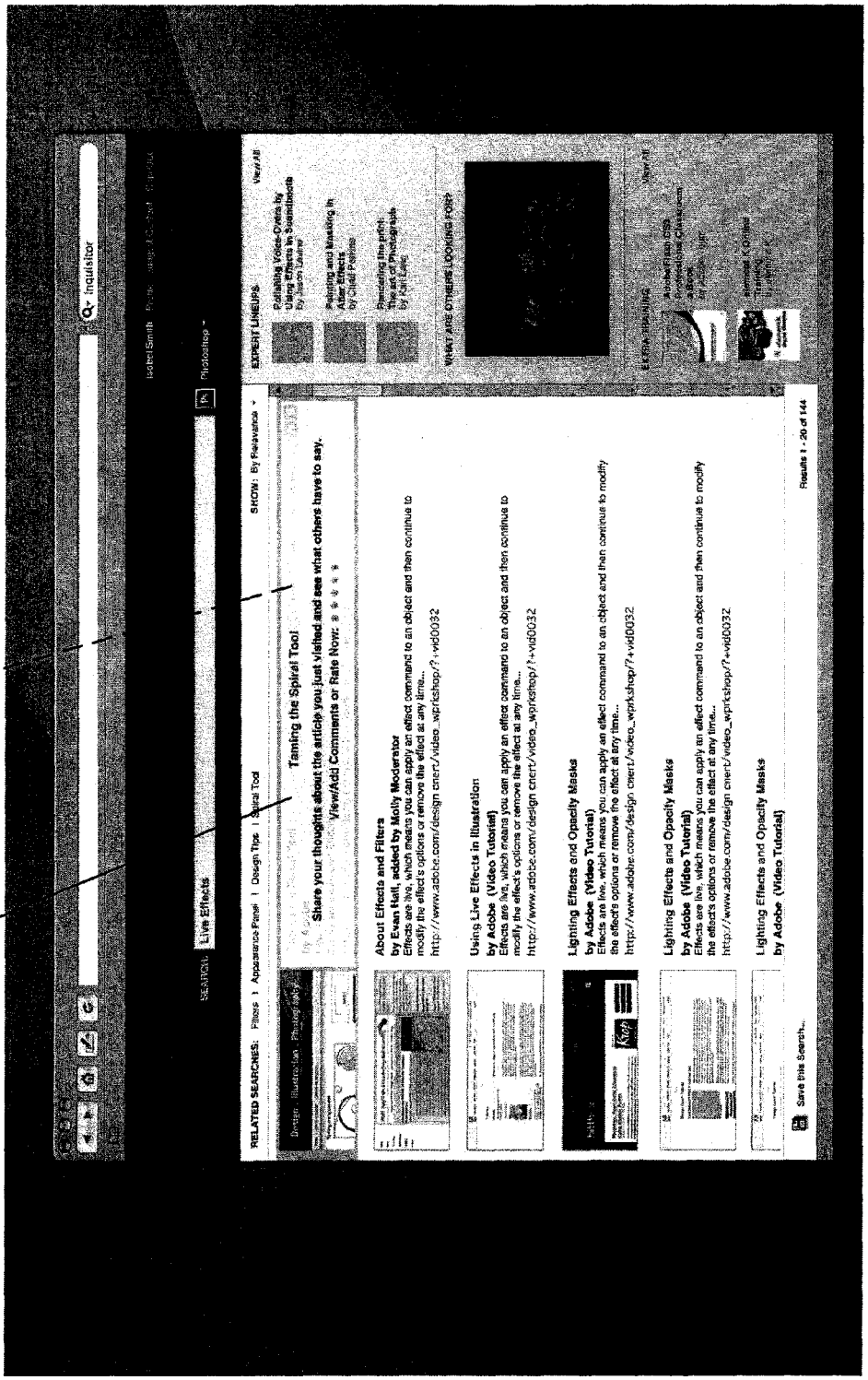
FIG. 3 depicts a screen shot showing a search results list which has been returned to after viewing the selected item from the original search results list wherein additional content is included in accordance with embodiments of the invention.

In the example presented in FIGS. 1-3, the user has entered the term "Live Effects" as a query in order to receive additional information regarding this particular option in the software application the user is using. In response to the user entering the term "Live Effects" the online help system provides a search results list 12. The search results list 12 includes several entries 14, 16, 18, 20, 22, and 24.

In this example the entries presented as a result of the search include entry 12 titled "Taming the Spiral Tool" which is authored by the entity that is also the provider of the software application. Entry 14 is titled "About Effects and Filters" and is authored by a third party. Entry 16 is titled "Using Live Effects in Illustration", authored by the entity that is also the provider of the software application. In this instance the search results entry is in the form of a video tutorial. Entries 20, 22 and 24 are titled "Lighting Effects and Opacity Masks" are also authored by the entity that is also the provider of the software application and in the form of a video tutorial. The search results are not limited to only entries produced by the entity hosting the online help system, but can include entries from third parties that provide impartial information relating to the topic being queried.

The entries may be in the form of text files, audio files, video files (including tutorials) and the like. The user can select one of the entries (e.g., by clicking on the desired entry using the left-click button of a mouse) and be taken to a web page that provides additional information regarding the query. In a particular example to user has selected entry 14, an article titled "Taming the Spiral Tool".

Referring now to FIG. 2, a screen shot 40 is shown wherein the user has navigated to the web page including the article "Taming the Spiral Tool". The article 42 is presented in the user for user review. After the user has viewed the article the user can navigate back to be search results list, for example by clicking the "back" navigation button 44. This results in the GUI screen 50 shown in FIG. 3 being presented to the user.

Referring now to FIG. 3, the user is presented with the GUI screen 50 wherein the same search results list is shown in FIG. 1, however the search results list 12 has been modified with additional content 52. In this example the additional content 52 is provided as an overlay covering entry 12, though other embodiments could present the additional content in any of a variety of ways. Entry 12 is still visible through the additional content 52. The additional content 52 allows the user to provide comments regarding the item from the search results list the user has previously navigated to. In this embodiment additional content 52 can be selected (e.g., clicked on) and the user will be prompted to enter comments regarding the item reviewed by the user. Additional content 52 in this example also includes a sequence of stars from 1 to 5 (read left to right) wherein the user can click on a star to provide a ranking of the content previously navigated to by the user. The comments and ranking can be used by other users who perform a search to determine whether a particular search result entry is worth visiting.

The determination regarding whether to provide the additional content upon the user returning to the search results list can be accomplished in several ways. For example, in one embodiment the user can select the "Back" navigation button in a web browser to return to the search results list. The navigation action is overridden such that a page with the search results and the additional content is provided (as opposed to the page with has the search results without the additional content). This is useful when the user has just navigated to the item of interest from the search results list with no intervening web page having been visited.

In another embodiment, cookies associated with the user can be examined in order to determine whether the search results list has been previously navigated to. When the search results list has been navigated to previously, but not necessarily immediately prior to the web page currently being viewed by the user, the search results list and the additional content are presented to the user upon a review of cookie data wherein the cookie data indicates the search results list has been previously viewed by the user.

In another embodiment, using a non-web type application, this feature of providing the additional content upon return to a search results list is hard-coded into the application.

The presently disclosed method and apparatus requesting information upon returning to a search results list enables the entity providing the online help system to gather information from users more efficiently to determine how useful certain content is. It is also useful for other users when the selected item is in a search results list, as the users can review the comments and ranking to determine how useful the content has been to other users. The presently disclosed method and apparatus requesting additional information upon returning to a search results list also makes it easier for the users to provide commentary as the users do not have to stop what they are doing and perform the extra steps of having to navigate to another page, submit comments and/or a ranking, and then return back to the search results list.

Figure 4:
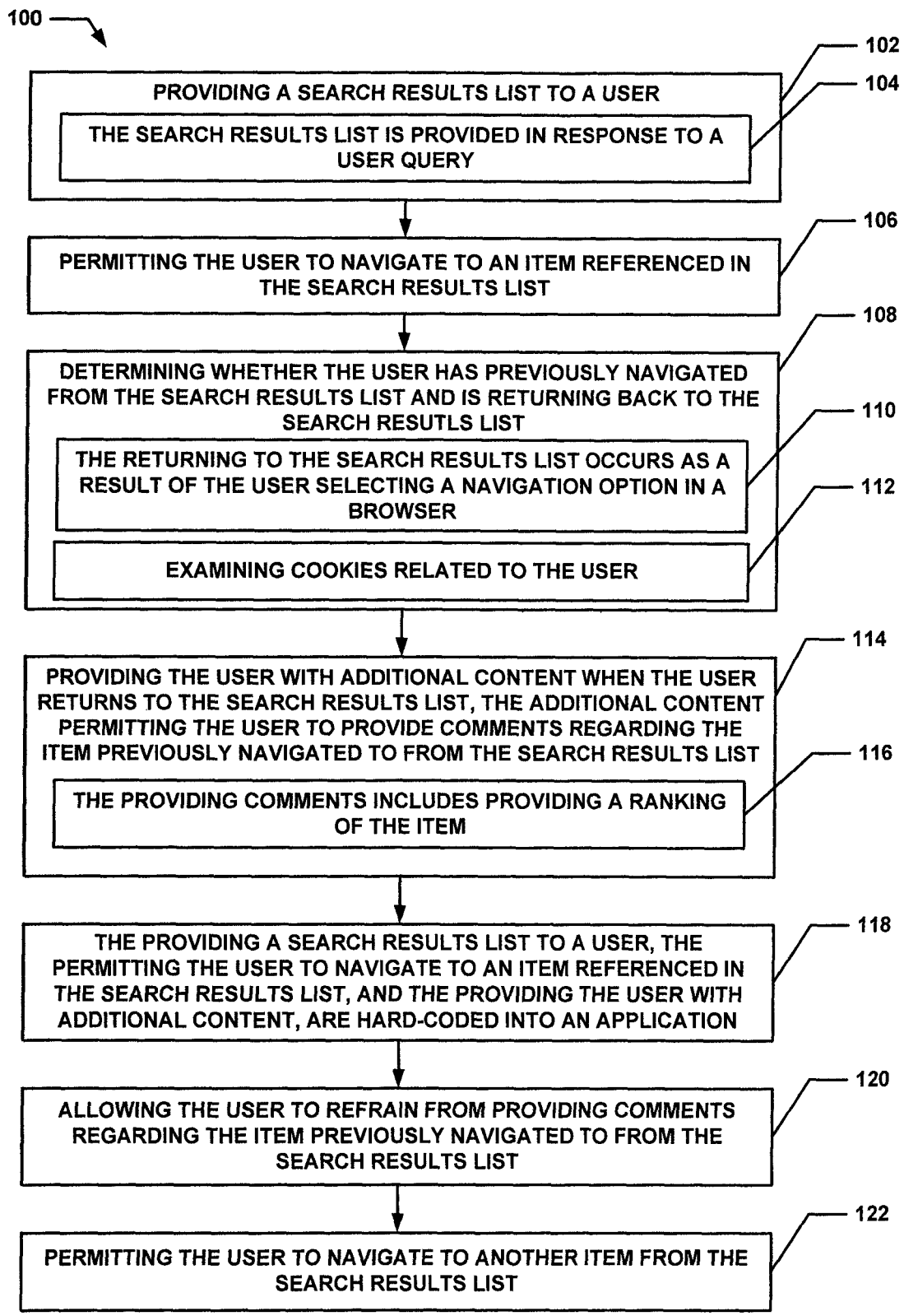
FIG. 4 shows a flow diagram of a particular embodiment of a method for requesting information upon returning to a search results list in accordance with embodiments of the invention.

A flow chart of a particular embodiment of the presently disclosed method for requesting information upon returning to a search results list is depicted in FIG. 4. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 4, a particular embodiment of a method 100 of requesting information upon returning to a search results list is shown. Method 100 begins with processing block 102 which discloses providing a search results list to a user. As shown in processing block 102, the search results list is provided in response to a user query. The system performing these functions may be an online help system for a particular application, or a general search engine used for retrieving information relating to user-entered topics.

Processing block 104 recites permitting the user to navigate to an item referenced in the search results list. This is typically accomplished by the user clicking on a link included in the search results list. For example, the user can left-click on the desired search results list item and be transported to the web page for the selected item.

Processing block 108 discloses determining whether the user has previously navigated from the search results list and is returning back to the search results list. This can be accomplished in several ways. One way to determine if the user is returning to the search results list is shown in processing block 110 which states wherein the return to the search results list occurs as a result of the user selecting a navigation option in a browser. The user can click on the "back" button and be returned the previous page which may be the page containing the search results list. The navigation action is overridden such that a page with the search results and the additional content is provided (as opposed to the page with has the search results without the additional content). This is useful when the user has just navigated to the item of interest from the search results list with no intervening web page having been visited.

Another technique used to determine if the user is returning to the search results list is shown in processing block 112 which states determining whether the user has previously navigated from the search results list comprises examining cookies related to the user to determine whether the user has previously visited the search results list. When the search results list has been navigated to previously, but not necessarily immediately prior to the web page currently being viewed by the user, the search results list and the additional content are presented to the user upon a review of cookie data wherein the cookie data indicates the search results list has been previously viewed by the user.

Processing block 114 recites providing the user with additional content when the user returns to the search results list, the additional content permitting the user to provide comments regarding the item previously navigated to from the search results list. As shown in processing block 116, the permitting the user to provide comments includes providing a ranking of the item. The user can provide commentary (including a ranking) without having to navigate from the search results list. For example, the user can enter comments as well clicking on one of a sequence of stars from 1 to 5 to provide a ranking of the content previously navigated to by the user. The comments and ranking can be used by other users who perform a search to determine whether a particular search result entry is worth visiting. The search results are not limited to only entries produced by the entity hosting the online help system, but can include entries from third parties that provide impartial information relating to the topic being queried.

Processing block 118 discloses, in certain embodiments, the providing a search results list to a user, the permitting the user to navigate to an item referenced in the search results list, and the providing the user with additional content, are hard-coded into an application. For non-web type applications, this feature of providing the additional content upon returning to a search results list is hard-coded into the application.

Processing block 120 states allowing the user to refrain from providing comments regarding the item previously navigated to from the search results list. In some instances the user may decide not to provide comments regarding the selected item from the search results list. The user can continue without being required to enter comments Processing block 122 recites permitting the user to navigate to another item from the search results list. Referring back to FIG. 3 for example, the user can click on search results list entry 18, and be forwarded to the web page for that entry. Upon returning back to the search results list, the user is again provided with additional content, this time overlaying search results entry 18. The user can then enter comments regarding entry 18.

Figure 5:
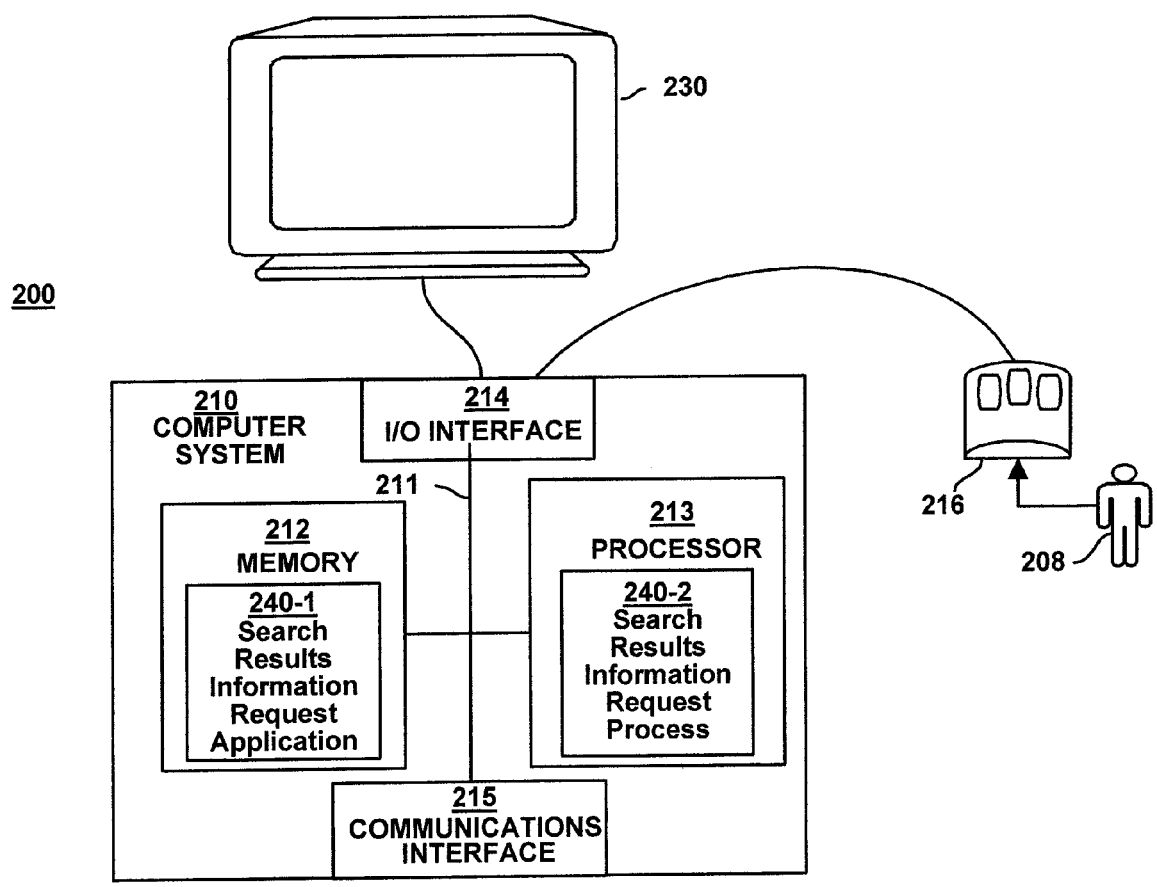
FIG. 5 illustrates an example computer system architecture for a computer system that requests information upon returning to a search results list in accordance with embodiments of the invention.

FIG. 5 is a block diagram illustrating an example computer system 200 for implementing search results information request function 240 and/or other related processes to carry out the different functionality as described herein.

As shown, computer system 200 of the present example includes an interconnect 211 that couples a memory system 212 and a processor 213 an input/output interface 214, and a communications interface 215.

As shown, memory system 212 is encoded with search results information request application 240-1. Search results information request application 240-1 can be embodied as software code such as data and/or logic instructions (e.g., code stored in the memory or on another computer readable medium such as a disk) that support functionality according to different embodiments described herein.

During operation, processor 213 of computer system 200 accesses memory system 212 via the interconnect 211 in order to launch, run, execute, interpret or otherwise perform the logic instructions of the search results information request application 240-1. Execution of search results information request application 240-1 produces processing functionality in search results information request process 240-2. In other words, the search results information request process 240-2 represents one or more portions of the search results information request application 240-1 (or the entire application) performing within or upon the processor 213 in the computer system 200. Also shown is user 208 who can interact with computer system 210 via user input device 216 for entering queries and selecting entries.

It should be noted that, in addition to the search results information request process 240-2, embodiments herein include the search results information request application 240-1 itself (i.e., the un-executed or non-performing logic instructions and/or data). The search results information request application 240-1 can be stored on a computer readable medium such as a floppy disk, hard disk, or optical medium. The search results information request application 240-1 can also be stored in a memory type system such as in firmware, read only memory (ROM), or, as in this example, as executable code within the memory system 212 (e.g., within Random Access Memory or RAM).

In addition to these embodiments, it should also be noted that other embodiments herein include the execution of search results information request application 240-1 in processor 213 as the search results information request process 240-2. Those skilled in the art will understand that the computer system 200 can include other processes and/or software and hardware components, such as an operating system that controls allocation and use of hardware resources associated with the computer system 200.

The presently disclosed method and apparatus requesting information upon returning to a search results list enables the entity providing the online help system to gather information from users more efficiently to determine how useful certain content is. It is also useful for other users when the selected item is in a search results list, as the users can review the comments and ranking to determine how useful the content been to other users. This also makes it easier for the uses to provide commentary as they do not have to stop to navigate to another page, submit comments and/or a ranking, then return back to the search results list.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer readable medium having computer readable code thereon for requesting information upon returning to a search results list, the medium comprising:
    instructions for providing a page with said search results list, said search results list having a first reference to a first item;
    instructions for receiving a command to navigate to the first item referenced in said search results list;
    instructions for receiving a navigation command to return to the page with said search results list from said first item;
    instructions for determining that said page with said search results list had previously been provided;
    instructions for, responsive to determining that said page with the search results list had previously been provided and said first item had been navigated to, providing said page with the search results list and additional content for receiving input entering search result comments or ratings regarding the first item, the additional content added to the page with said search results list as an overlay covering the first reference to the first item;
    wherein the first reference to the first item is visible through the provided overlay; and
    wherein, prior to navigation to the first item, the page with said search results list was provided without the additional content.

2. The computer readable medium of claim 1 further comprising instructions wherein in response to receiving a selection of a navigation option in a browser, said page with the search results list and the additional content is presented.

3. The computer readable medium of claim 1 further comprising instructions wherein said determining whether said page with said search results list had previously been provided comprises examining cookies to determine whether the page with said search results list had previously been visited.

4. The computer readable medium of claim 1 wherein said instructions for receiving input entering comments include instructions for permitting a ranking of said first item.

5. The computer readable medium of claim 1 further comprising instructions for providing an option to refrain from providing comments regarding said first item previously navigated to from said page with said search results list.

6. The computer readable medium of claim 5 further comprising instructions for permitting navigation to another item from said page with said search results list.

7. The computer readable medium of claim 1 further comprising instructions wherein said search results list is provided in response to a user query.

8. The computer readable medium of claim 1, wherein said comments comprise textual comments.

9. The computer-readable medium of claim 1, further comprising instructions for storing said comments, and instructions for providing said comments with said first item in response to a subsequent search request.

10. The computer-readable medium of claim 1, further comprising instructions for overriding the navigation command to return to the page with said search results list and wherein the instructions for providing additional content in addition to said search results list is further responsive to overriding the navigation command.

11. The computer readable medium of claim 1, wherein:
    said page with the search results list is provided in a graphical user interface for an online help application, and
    the instructions for providing said page with the search results list and additional content added to the page are coded into the online help application.

12. A method comprising:
    providing a page with a search results list, said search results list having a first reference to a first item;
    receiving a command to navigate to the first item referenced in said search results list;
    receiving a navigation command to return to the page with said search results list from said first item;
    determining that said page with said search results list had previously been provided;
    responsive to determining that said page with said search results list had previously been provided and said first item had been navigated to, providing said page with the search results list and additional content for receiving input entering search result comments or ratings regarding the first item, the additional content added to the page with said search results list as an overlay covering the first reference to the first item;
    wherein the first reference to the first item is visible through the provided overlay; and
    wherein, prior to navigation to the first item, the page with said search results list was provided without the additional content.

13. The method of claim 12 wherein in response to receiving a selection of a navigation option in a browser, said page with the search results list and the additional content is presented.

14. The method of claim 12 wherein said determining whether said page with said search results list had previously been provided comprises examining cookies to determine whether the page with said search results list had previously been visited.

15. The method of claim 12 wherein said receiving input entering comments includes permitting ranking of said first item.

16. The method of claim 12 further comprising providing an option to refrain from providing comments regarding said first item previously navigated to from said page with said search results list.

17. The method of claim 16 further comprising permitting navigation to another item from said search results list.

18. The method of claim 12, wherein said comments comprise textual comments.

19. The method of claim 12, further comprising instructions for storing said comments, and instructions for providing said comments with said first item in response to a subsequent search request.

20. A computer system comprising:
- a memory;
- a processor;
- a communications interface;
- an interconnection mechanism coupling the memory, the processor and the communications interface; and
- wherein the memory is encoded with an application for requesting information upon returning to a search results list, that when performed on the processor, configure the processor to:
  - provide a page with a search results list, said search results list having a first reference to a first item;
  - receive a command to navigate to the first item referenced in said search results list;
  - receive a navigation command to return to the page with said search results list from said first item;
  - determine that said page with said search results list had previously been provided;
  - responsive to a determination that said page with said search results list had previously been provided and said first item had been navigated to, providing said page with the search results list and additional content for receiving input entering search result comments or ratings regarding the first item, the additional content added to the page with said search results list as an overlay covering the first reference to the first item;
  - wherein the first reference to the first item is visible through the provided overlay; and
  - wherein, prior to navigation to the first item, the page with said search results list was provided without the additional content.

21. The computer system of claim 20 wherein said return to said page with said search results list occurs as a result of receiving a selection of a back navigation option in a browser and wherein, the processor is further configured to, in response to receiving a selection of the back navigation option in a browser, present said page with the search results list and the additional content.

22. The computer system of claim 20 wherein said processor is further configured to examine cookies to determine to determine whether the page with said search results list had previously been visited to determine whether said page with said search results list had previously been navigated from.

23. The system of claim 20, wherein said comments comprise textual comments.

24. The system of claim 20, wherein the processor is further configured to store said comments, and provide said comments with said first item in response to a subsequent search request.

* * * * *